United States Patent [19]

Fernando et al.

[11] Patent Number: 4,473,356
[45] Date of Patent: Sep. 25, 1984

[54] ELECTROMECHANICAL BRAILLE CELL AND METHOD OF OPERATING SAME

[75] Inventors: Llavanya X. Fernando, San Jose; Noel H. Runyan, Campbell, both of Calif.

[73] Assignee: Telesensory Systems, Inc., Mountain View, Calif.

[21] Appl. No.: 527,011

[22] Filed: Aug. 29, 1983

[51] Int. Cl.³ .................................. G09B 21/00
[52] U.S. Cl. ........................................ 434/114
[58] Field of Search ............... 434/113, 114; 340/407

[56] References Cited

U.S. PATENT DOCUMENTS

| | | | |
|---|---|---|---|
| 3,229,387 | 1/1966 | Linvill | 434/114 |
| 4,283,178 | 8/1981 | Tetzlaff | 434/114 |
| 4,379,697 | 4/1983 | Linvill | 434/114 |
| 4,445,871 | 5/1984 | Becker | 434/114 |

Primary Examiner—William H. Grieb
Attorney, Agent, or Firm—Harry E. Aine

[57] ABSTRACT

An electromechanical braille cell is disclosed wherein each cell includes six braille indicia formed by the free ends of six rods protruding through six openings in braille reading surface. The six rods are raised and lowered by six piezoelectric reeds. Applying an operating potential to a respective reed causes the reed to bend about a fulcrum at the supported root end of the reed causing the free end to deflect in such a manner as to cause the indicia rod to be raised and to protrude through an opening in the reading surface of the braille cell. Simultaneous energization of one or more of the six reeds defines a given braille character sensed by the braille reader. Modulating the voltage applied to a given reed serves to vibrate the respective rod for sensing by the braille reader for indicating information, such as upper case, to the reader in addition to the braille character information represented by merely elevating a pattern of rods above the braille reading surface.

3 Claims, 6 Drawing Figures

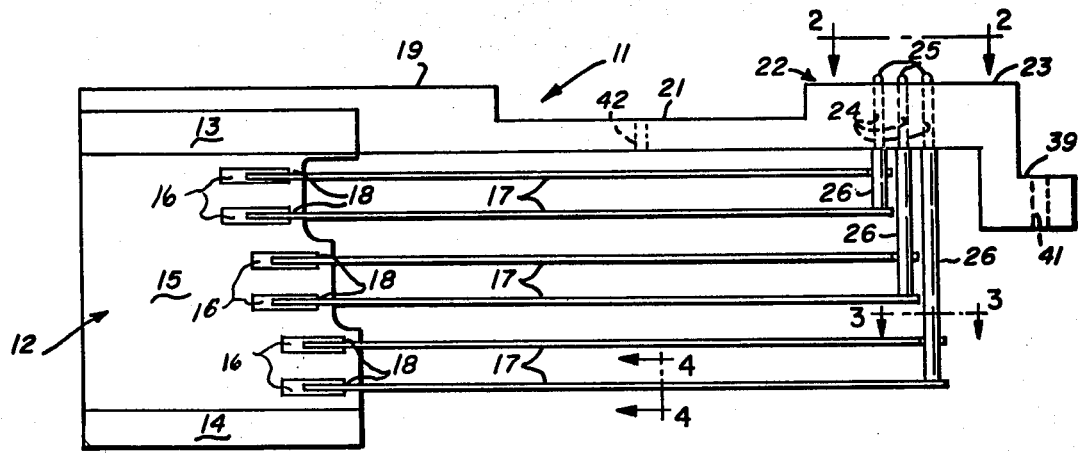
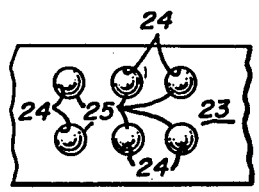
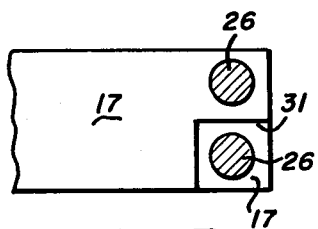
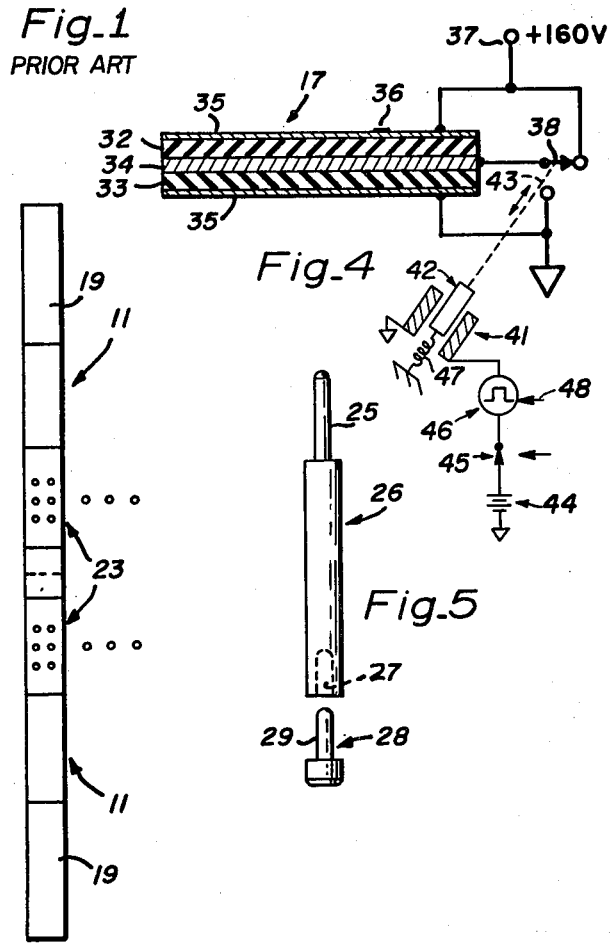
Fig_1 PRIOR ART
Fig_2
Fig_3
Fig_4
Fig_5
Fig_6

ELECTROMECHANICAL BRAILLE CELL AND METHOD OF OPERATING SAME

BACKGROUND OF THE INVENTION

The present invention relates in general to electromechanical braille cells and, more particularly, to an improved method of operating same.

DESCRIPTION OF THE PRIOR ART

Heretofore, electromechanical braille cells have utilized six piezoelectric reeds which bend in response to the application of an electric voltage thereacross for urging the tip of sensing rods through an array of six openings in a braille cell reading surface. The protruding tips of the sensing rods are sensed by the finger of the operator to define a braille character. One such prior art arrangement is disclosed in U.S. Pat. No. 4,283,178 issued Aug. 11, 1981 and assigned to the same assignee as the present invention.

One of the problems with the standard braille cell and code is that with only six rods it was not possible to include the English alphabet and also indicate other information such as upper and lower case with a single setting of the six rods. Upper case was indicated by using two cells. The first cell was set to indicate the case.

Others have proposed to add two additional rods to the standard six rod cell for indicating upper and lower case and other information. However, this adds substantial complexity to the standard six rod electromechanical braille cell.

It would be desirable if additional information, such as case, could be imparted to the reader by a single setting of the standard six rod electromechanical braille cell.

SUMMARY OF THE PRESENT INVENTION

The principal object of the present invention is the provision of an improved six rod electromechanical braille cell and method of operating same so as to give additional information to the reader.

In one feature of the present invention, additional information, such as upper or lower case, for a single setting (character) of the standard six element braille cell is imparted to the reader by vibrating one or more of the six elements (rods) of the braille cell, whereby the standard six element braille cell may be used without having to add additional elements to the cell.

BRIEF DESCRIPTION OF THE DRAWINGS

FIG. 1 is a side elevational view of a standard, prior art, six element electromechanical braille cell, FIG. 2 is an enlarged plan view of a portion of the structure of FIG. 1 taken along line 2—2 in the direction of the arrows, FIG. 3 is an enlarged sectional view of a portion of the structure of FIG. 1 taken along line 3—3 in the direction of the arrows, FIG. 4 is an enlarged cross sectional view of one of the piezoelectric reeds of FIG. 1 taken along line 4—4 in the direction of the arrows, and schematically depicting the electrical circuitry for applying the operating potential to the respective reed, FIG. 5 is an enlarged exploded view of one of the sensing rods of FIG. 1, and FIG. 6 is a plan view of a plurality of the braille cells of FIG. 1 arranged for display of two lines of braille text.

DESCRIPTION OF THE PREFERRED EMBODIMENTS

Referring now to FIGS. 1 and 2, there is shown a prior art standard electromechanical braille cell 11. The braille cell 11 includes a vertical base plate 12 as of ABS plastic material formed by injection molding and having upper and lower horizontal flange portions 13 and 14 with a recessed central web portion 15 extending vertically therebetween. The web portion 15 is notched from the inside edge to provide six generally rectangular openings 16 to receive the root portions of six piezoelectric reeds 17. The piezoelectric reeds are captured in an interference fit at a restricted neck portion 18 at the entrance to each of the rectangular openings 16. The neck portions 18 define fulcrum points about which the piezoelectric reeds 17 bend in response to an applied operating voltage. A top plate 19 is secured to the base plate 12 via the intermediary of screws, not shown. The top plate 19 is recessed at 21 and 39 to receive stringers, not shown, for mounting the individual braille cells 11 transversely of the stringers.

A sensing plate portion 22 of the top plate 19 includes an upper sensing surface 23 which is apertured by means of six vertically directed bores 24 which slideably receive therewithin a narrow neck portion 25 of a sensing rod 26. The upper end of the sensing rod 26 is rounded. That portion of the rod which protrudes above the surface 23 is sensed by the finger of the operator to determine the pattern being displayed on the individual braille cell 11.

The lower extremity of the sensing rod 26 (see FIG. 5) is counterbored at 27 to slideably receive therewithin in a telescoping manner a rod extender insert 28. The insert 28 includes a dowel portion 29 which slides within the counterbore 27 in the main body of the rod 26. The dowel portion makes a tight interference fit with the internal walls of the bore 27 so that by adjusting the degree of penetration of the dowel 29, the axial length of the composite rod structure 26 is determined.

The sensing rods 26 rest at their lower extremity upon the free end portions of the respective piezoelectric reeds 17. The reeds 17 are cantilevered about the fulcrum support 18 with the free end portions thereof supporting their respective sensing rods 26. The reeds 17 are arranged in a stair step fashion in pairs. The uppermost reed of each pair is apertured to allow passage therethrough of the sensing rod resting upon the lowermost reed of each pair. The aperture is conveniently formed by a notch which notches out one of the corners of the respective reed. Such a notched corner is shown at 31 in FIG. 3. The sensing rod 26 associated with the uppermost reed of each stair step pair rests upon the corner of the reed at the free end of the reed 17. The sensing rods 26 associated with the successively lower pairs or steps of the stack of reeds 17 pass by the ends of the reeds above that pair in the stack of reeds 17.

Referring now to FIG. 4, the piezoelectric reeds 17 each comprise a sandwich structure of piezoelectric material in which two layers of electrically polarized piezoelectric material 32 and 33 sandwich therebetween a leaf of conductive material 34, as of brass. The outer surfaces of the piezoelectric layers 32 and 33 are covered with a thin layer of electrically conductive material 35 as of gold or nickel. In a typical example, the reeds are approximately ¼ inch wide, 2 inches in length and the brass leaf 34 has a thickness as of 0.001 to 0.002 inch and piezoelectric layers 32 and 33 have thicknesses as of 0.007 to 0.008 inch. The conductive layer 35 has a thickness, as of 50 micro inches. Such reeds are commercially available from NGK of Nagoya, Japan as model MT-114H bimorphous elements.

The reeds utilized herein are electrically polarized for parallel operation at the factory by the application of a high voltage across conductive layers 35. A polarization mark 36 indicates the positive terminal during the polarizing process.

The operating potentials are applied to the respective reeds 17 by means of a circuit schematically indicated in FIG. 4. More particularly, a source of relatively high voltage, as of +160 volts is applied to terminal 37 which is connected to the upper layer 35 of the bimorphous piezoelectric reed 17. The central leaf 34 is connected to one terminal of a double pole-double throw switch 38 which is preferably a transistor switch. The lower face electrode 35 of the reed 17 is connected to ground. The switch 38 selectively couples the central leaf 34 either to the high positive potential or to ground potential which either places the full 160 volts across the lower piezoelectric layer 33, or across the upper piezoelectric layer 32 as determined by the position of switch 38.

When positive potential is applied across the upper piezoelectric layer 32, it deflects the reed upwardly about the fulcrum 18 and conversely when the positive potential is applied across the lower piezoelectric layer 33, it deflects the reed 17 downwardly about the fulcrum 18. The bending moment selectively applied to the reed causes the sensing rod 26 associated with that reed to be either fully elevated as determined by the shoulder of the rod being stopped by the marginal edge of the respective bore 24 in the sensing plate 19 or conversely when the bending moment is downward, the reed deflects downward and gravity operating on the respective sensing rod 26 causes the rod to be fully retracted so that the degree to which the sensing rod protrudes, if any, from the sensing surface 23 is greatly reduced relative to the amount of protrusion when the rod is fully elevated. The operator senses the pattern of protruding rods 26 to define a given braille character.

In the schematic diagram of FIG. 4, the switch 38 is closed to the grounded terminal for elevating the sensing rod 26. The switch 38 is closed to ground by means of an electrical solenoid 41 magnetically operating on a magnetically permeable core member 42 mechanically coupled via rod 43 to the switch 38. Current is fed to the solenoid 41 from a battery 44 via the intermediary of a switch 45 and an interrupter 46. A compression spring 47 is coupled to the core member 42 and spring biases the switch 38 to the high voltage terminal 37 for holding the sensing rod 26 in the normally retracted position.

To raise the sensing rod 26 for indicating to the reader one element of a braille character, the switch 45 is closed thus energizing the solenoid 41 and pulling the core 42 and switch actuating rod 43 against the spring bias of spring 47. In this manner, switch 38 is closed to the ground position, placing the positive voltage across the upper piezoelectric layer 32, for raising the sensing rod 26.

To indicate additional information, such as the case of the braille character being displayed, the interrupter 46 on one or more of the cell elements is energized via an input to the interrupter at 48. This will interrupt the current to the solenoid at a desired repetition rate and produce vibration of the respective sensing rod 26. The braille reader senses the vibration and thus receives the additional information, such as upper or lower case of the braille character being read by the reader. This additional information is imparted to the braille reader without having to use a second braille cell and without having to add additional sensing rods 26 to the standard six rod electromechanical braille cell 11.

Although the embodiment of FIG. 4 is depicted using a mechanical switch 38, an alternative preferred embodiment would use a transistor switch in its place. Such a transistor switch is readily electronically modulated in a conventional manner to produce vibration of the sensing rod 26.

Also, vibration of all of the sensing rods of a braille character need not be employed to indicate the additional information. As an alternative, one or more of the sensing rods 26 could be vibrated to input the additional information.

Electrical connection is made to the root ends of the respective reeds by means of a printed circuit board, mating with the recessed web 15 not shown and leads which connect the circuit on the printed circuit board to the respective terminals of each of the respective reeds 17 in a manner as indicated in FIG. 4.

In a typical example, the sensing rod 26 is made of ABS plastic, has a diameter of 0.082 inch and a length for the neck portion 25 of 0.328 inch. The rods are conveniently made by injection molding and their length from the shoulder to the base varies from 0.095 inch to 0.845 inch.

An advantage to the manner in which the electrical potentials are applied to the reeds 117 as shown in FIG. 4 is that the piezoelectric layers 32 and 33 are permanently electrically polarized in the same sense as that of the applied operating electric field. More particularly, the electric vector of layer 32 is perpendicular to and directed toward the plane of the central leaf 34, whereas the permanent electric polarization vector of the lower piezoelectric layer 33 is normal to the leaf 34 and directed away from the leaf. The applied voltage for actuation of the reed 17 is thus always applied in the direction of the electric field polarization of the layers 32 and 33. In this manner, depolarization of the reeds with usage does not occur.

The inner ends of the respective top plates 19 are recessed at 39 for mounting to a stringer, not shown, extending laterally of the individual electromechanical braille cells 11. The recessed portion 39 includes a vertical bore 41 to receive a screw passing into a tapped bore in the stringer. Similarly, a tapped bore 42 is provided in the centrally recessed portion 21 of the top plate to receive a screw passing through the central stringer and threadably mating with the threads of the bore 42.

By cantilevering the reeds 17, the braille cells 11 may be arranged in a pair of rows, as shown in FIG. 6, thereby providing two relatively closely spaced lines of braille text.

What is claimed is:

1. In a method for operating an electromechanical braille cell of the type having a braille reading surface intersected by a plurality of openings therein with a plurality of rods operative within said openings and said rods being elevated in a predetermined pattern above said braille reading surface for sensing by the fingers of the braille reader to represent certain braille characters, the improvement comprising the step of:

vibrating at least one of said elevated rods, representative of a certain predetermined braille character within its respective opening and relative to said braille reading surface for sensing by the finger of the braille reader for indicating information to said braille reader in addition to the braille character information represented by merely elevating the pattern of rods above the braille reading surface.

2. The method of claim 1 wherein said additional information represented by the step of vibrating at least one of said rods relates to the case of said braille character which is otherwise represented by merely elevating the certain predetermined pattern of rods.

3. In an electromechanical braille cell of the type having a braille reading surface intersected by a plurality of openings therein with a plurality of rods operative within said openings and said rods being elevated in a predetermined pattern above said braille reading surface for sensing by the finger of the braille reader to represent certain predetermined braille characters, the improvement comprising:

means for vibrating at least one of said elevated rods within its respective opening and relative to said braille reading surface for sensing by the finger of the braille reader for indicating information to said braille reader in addition to the braille character information represented by merely elevating the pattern of rods above the braille reading surface.

* * * * *